US010073252B2

(12) United States Patent
Ikegaya

(10) Patent No.: US 10,073,252 B2
(45) Date of Patent: Sep. 11, 2018

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Yuki Ikegaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/480,655

(22) Filed: Apr. 6, 2017

(65) Prior Publication Data
US 2017/0293111 A1 Oct. 12, 2017

(30) Foreign Application Priority Data
Apr. 12, 2016 (JP) .................... 2016-079395

(51) Int. Cl.
*G02B 13/18* (2006.01)
*G02B 9/62* (2006.01)
*G02B 13/00* (2006.01)
*G02B 5/00* (2006.01)
*G02B 9/60* (2006.01)
*G02B 13/04* (2006.01)
*G02B 27/00* (2006.01)

(52) U.S. Cl.
CPC ............ *G02B 13/006* (2013.01); *G02B 9/62* (2013.01); *G02B 13/0045* (2013.01); *G02B 5/005* (2013.01); *G02B 9/60* (2013.01); *G02B 13/04* (2013.01); *G02B 13/18* (2013.01); *G02B 27/0025* (2013.01)

(58) Field of Classification Search
CPC .. G02B 13/0045; G02B 27/0025; G02B 9/60; G02B 13/18; G02B 9/62; G02B 5/005; G02B 13/04; G02B 13/006

USPC ....... 359/713, 714, 717, 740, 752, 753, 761, 359/762, 770, 793
See application file for complete search history.

(56) References Cited

U.S. PATENT DOCUMENTS

| 5,861,999 A * | 1/1999 | Tada .................... G02B 13/06 359/713 |
| 6,038,085 A * | 3/2000 | Nakazawa ............... G02B 9/12 359/753 |
| 9,618,731 B2 | 4/2017 | Ikegaya |
| 2009/0080093 A1* | 3/2009 | Ning ..................... G02B 13/04 359/753 |

(Continued)

FOREIGN PATENT DOCUMENTS

| JP | H04-267212 A | 9/1992 |
| JP | 2013-88805 A | 5/2013 |

*Primary Examiner* — Evelyn A Lester
(74) *Attorney, Agent, or Firm* — Carter, DeLuca, Farrell & Schmidt LLP

(57) ABSTRACT

An optical system includes, in order from object side to image side, a negative front lens unit, an aperture stop, and a positive rear lens unit. The front lens unit consists of, in order from object side to image side, a negative first lens having a concave surface on image side, a negative second lens with a concave surface on image side, and a positive third lens. The rear lens unit consists of, in order from object side to image side, a positive fourth lens, and a cemented lens formed by cementing a positive lens and a negative lens together. Here, a distance on optical axis from a lens surface on object side of the first lens to a lens surface on image side of the third lens, a focal length of the third lens, and a focal length of the optical system are set to appropriate values.

13 Claims, 4 Drawing Sheets

(56) References Cited

U.S. PATENT DOCUMENTS

| | | | |
|---|---|---|---|
| 2011/0051205 A1* | 3/2011 | Jo .......................... | G02B 13/04 |
| | | | 358/483 |
| 2012/0056976 A1* | 3/2012 | Lee ....................... | G02B 13/04 |
| | | | 359/680 |
| 2014/0340767 A1* | 11/2014 | Mori .................... | G02B 13/004 |
| | | | 359/715 |
| 2016/0202452 A1* | 7/2016 | Kuo ....................... | G02B 13/04 |
| | | | 359/708 |
| 2016/0223800 A1 | 8/2016 | Ikegaya | |

\* cited by examiner

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the same. Such an optical system is suitable for an imaging optical system used in an image pickup apparatus such as a silver halide film camera, a digital still camera, a digital video camera, a monitoring camera, and a television camera.

Description of the Related Art

In recent years, optical systems used in image pickup apparatuses have been required to achieve a small size as a whole and a wide angle of view at the same time. For example, video cameras, on-vehicle cameras, and the like are required to achieve a wide angle of view in order to shoot a wide range, and to reduce off-axial aberrations (including astigmatism, curvature of field, distortion, and the like) for improvement in visibility at a peripheral part of the field. Each of Japanese Patent Application Laid-Open No. 2013-88805 and Japanese Patent Application Laid-Open No. H04-267212 discloses an optical system including a front lens unit having a negative refractive power, an aperture stop, and a rear lens unit having a positive refractive power, which are disposed in order from an object side to an image side, and in which the front lens unit includes a negative lens and a positive lens.

In general, an optical system to attain a wide angle of view is constructed by disposing a front lens unit having a negative refractive power on an object side of an aperture stop, and disposing a rear lens unit having a positive refractive power on an image side of the aperture stop. This asymmetric refractive power arrangement on both sides of the aperture stop tends to increase the occurrence of various aberrations, which are attributed to the asymmetry and include coma, distortion, and lateral chromatic aberration. Particularly, an attempt to reduce a total length of the optical system and to reduce an effective diameter of a front lens while widening an angle of view is likely to result in increases in refractive power of the negative lens and the positive lens constituting the front lens unit (absolute values of the refractive powers are increased). This leads to an increase in incident angle of an off-axial ray which is incident on the front lens unit and an increase in output angle of the off-axial ray which is outputted from the front lens unit, thereby increasing the occurrence of astigmatism and causing a difficulty in keeping the astigmatism small.

SUMMARY OF THE INVENTION

An object of the present invention is to provide an optical system having a small size as a whole and a wide angle of view, yet being capable of easily achieving a high optical performance on the entire field.

An optical system of the present invention comprises, in order from an object side to an image side:
a front lens unit having a negative refractive power;
an aperture stop; and
a rear lens unit having a positive refractive power, wherein
the front lens unit consists of, in order from the object side to the image side, a first lens having a negative refractive power with a concave surface being on the image side, a second lens having a negative refractive power with a concave surface on the image side, and a third lens having a positive refractive power,
the rear lens unit consists of, in order from the object side to image side, a fourth lens having a positive refractive power, and a cemented lens formed by cementing a positive lens and a negative lens together, and
the following conditional expressions are satisfied:

$1.0 < DFG/f < 2.5$, and $3.0 < f3/f < 20.0$ where DFG represents a distance on an optical axis from a lens surface on the object side of the first lens to a lens surface on the image side of the third lens, f3 represents a focal length of the third lens, and f represents a focal length of the optical system.

Further features of the present invention will become apparent from the following description of exemplary embodiments with reference to the attached drawings.

DESCRIPTION OF THE EMBODIMENTS

Preferred embodiments of the present invention will be described below on the basis of the accompanying drawings. An optical system of the present invention comprises a front lens unit having a negative refractive power, an aperture stop, and a rear lens unit having a positive refractive power, which are disposed in order from an object side to an image side. The front lens unit consists of, in order from the object side to the image side, a first lens having a negative refractive power and having a concave surface on the image side, a second lens having a negative refractive power and having a concave surface on the image side, and a third lens having a positive refractive power. The rear lens unit consists of, in order from the object side to the image side, a fourth lens having a positive refractive power, and a cemented lens formed by cementing a positive lens and a negative lens together.

The two lenses constituting the cemented lens are the positive lens and the negative lens. The two lenses may be arranged in any order in an optical axis direction. The fourth lens includes an aspherical lens surface.

Figure 1:
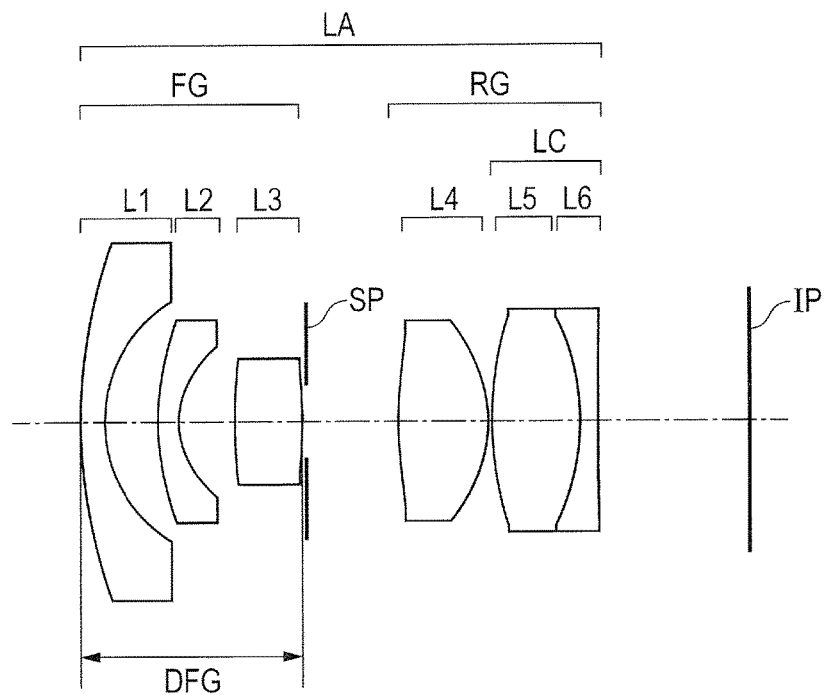
FIG. 1 is a cross-sectional view of lenses in a wide-angle fixed focal length lens apparatus of a first embodiment of the present invention, illustrating a case of causing the lens unit to focus on an infinitely distant object.
Figure 2:
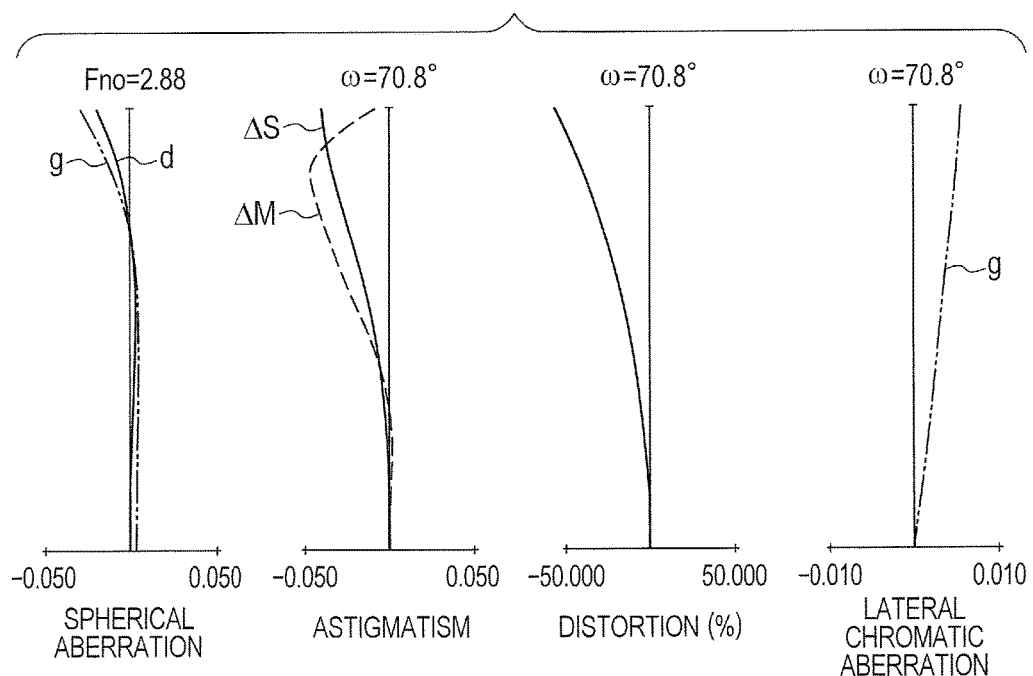
FIG. 2 illustrates aberration diagrams in the case of causing the wide-angle fixed focal length lens apparatus of the first embodiment to focus on the infinitely distant object.
Figure 3:
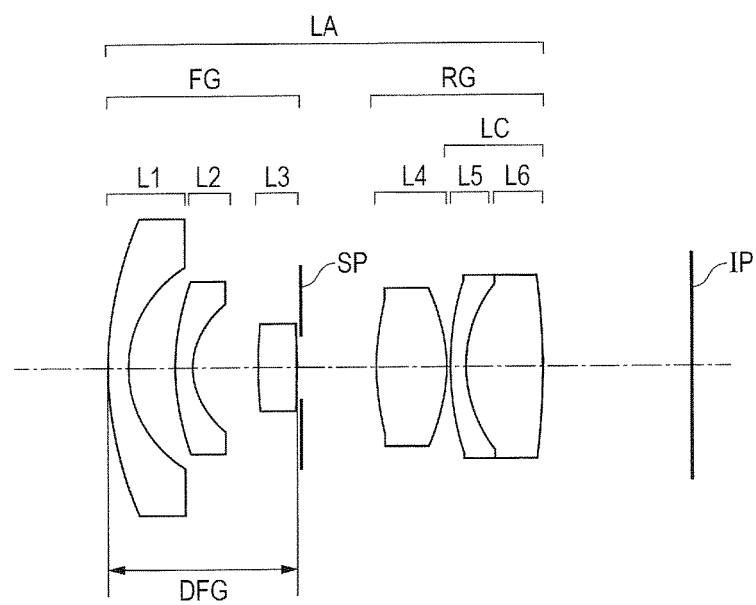
FIG. 3 is a cross-sectional view of lenses in a wide-angle fixed focal length lens apparatus of a second embodiment of the present invention, illustrating a case of causing the lens unit to focus on an infinitely distant object.
Figure 4:
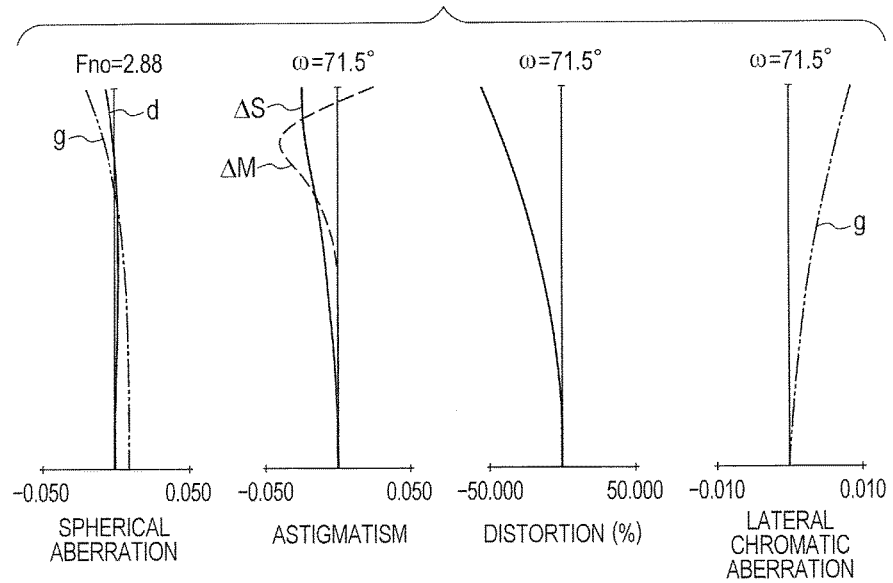
FIG. 4 illustrates aberration diagrams in the case of causing the wide-angle fixed focal length lens apparatus of the second embodiment to focus on the infinitely distant object.

FIG. 1 is a cross-sectional view of lenses of a first embodiment of the present invention. FIG. 2 illustrates vertical aberration diagrams of the first embodiment in the case of focusing on an infinitely distant object. The first embodiment is an optical system having the following parameters, namely, an F-number at 2.88, an angle of view at 141.6°, and a paraxial angle of view at 103.98°. FIG. 3 is a cross-sectional view of lenses of a second embodiment of the present invention. FIG. 4 illustrates vertical aberration diagrams of the second embodiment in the case of focusing on an infinitely distant object. The second embodiment is an optical system having the following parameters, namely, the F-number at 2.88, the angle of view at 148.8°, and the paraxial angle of view at 106.24°.

Figure 5:
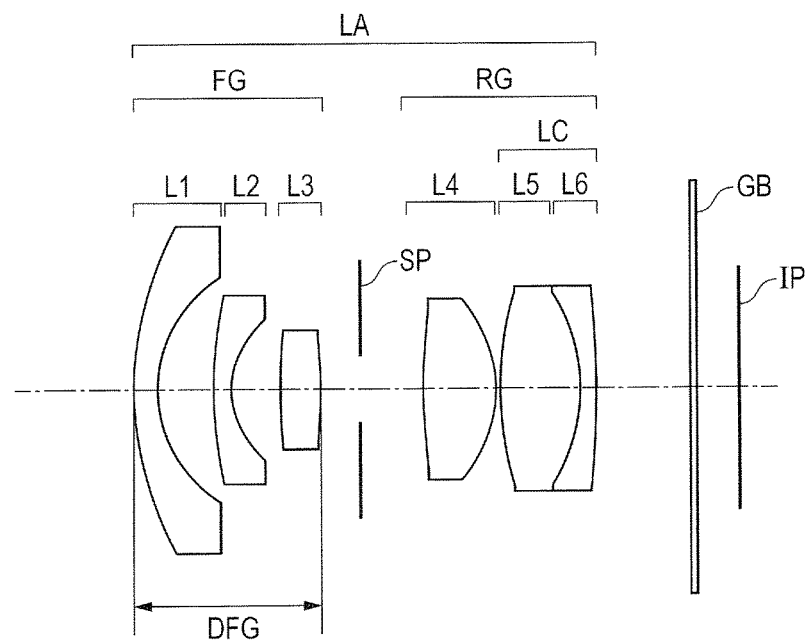
FIG. 5 is a cross-sectional view of lenses in a wide-angle fixed focal length lens apparatus of a third embodiment of the present invention, illustrating a case of causing the lens unit to focus on an infinitely distant object.
Figure 6:
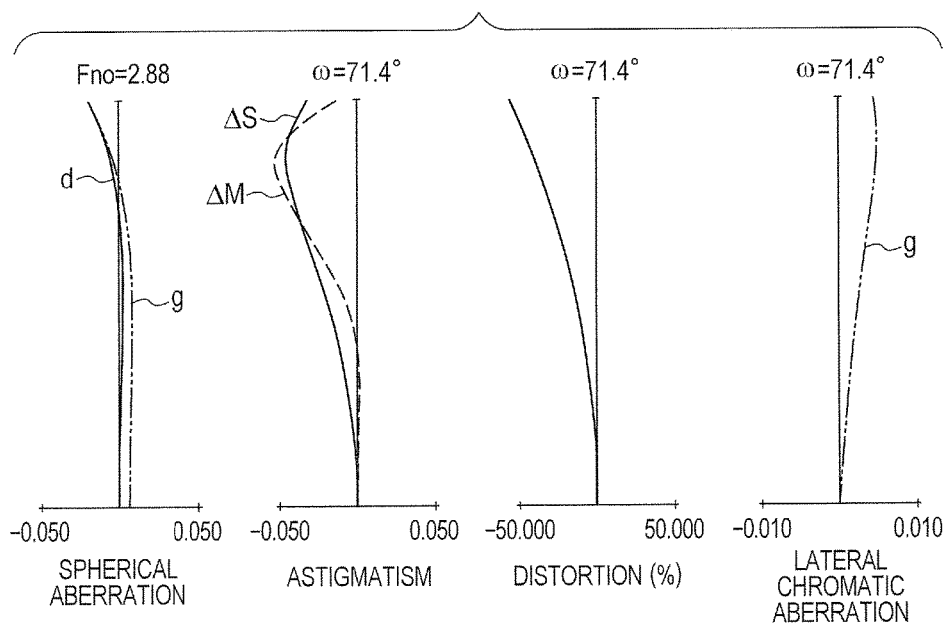
FIG. 6 illustrates aberration diagrams in the case of causing the wide-angle fixed focal length lens apparatus of the third embodiment to focus on the infinitely distant object.
Figure 7:
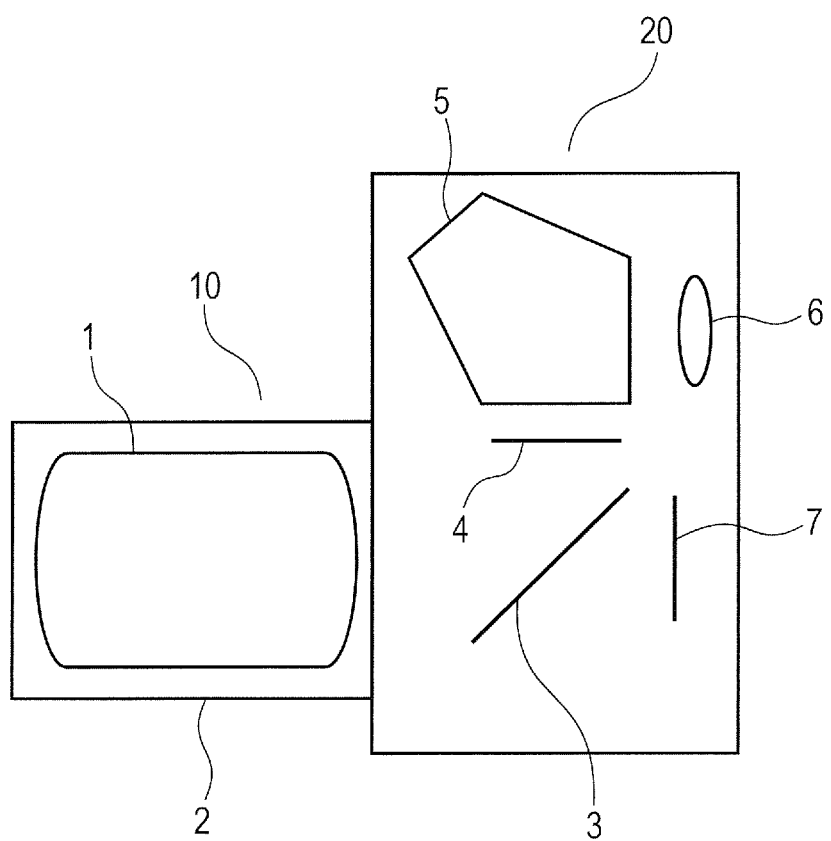
FIG. 7 is a schematic diagram of a main part of an image pickup apparatus of the present invention.

FIG. 5 is a cross-sectional view of lenses of a third embodiment of the present invention. FIG. 6 illustrates vertical aberration diagrams of the third embodiment in the case of focusing on an infinitely distant object. The third embodiment is an optical system having the following parameters, namely, the F-number at 2.88, the angle of view at 142.8°, and the paraxial angle of view at 105.00°. FIG. 7 is a schematic diagram of a camera (an image pickup apparatus) including the optical system of the present invention.

The optical system of each of the embodiments is suitable for an imaging optical system used in an image pickup apparatus (an optical apparatus) such as a digital still camera, a digital video camera, and a silver halide film camera. In each of the cross-sectional views of the lenses, the left side represents an object side (a front side) while the right side represents an image side (a rear side). Note that the optical system of each of the embodiments may be used as a projection lens unit for a projector and the like. In this case, the left side of each cross-sectional view represents a screen side while the right side thereof represents a projected image side.

In each cross-sectional view of lenses, reference symbol LA denotes an optical system. The optical system LA has a configuration that includes a front lens unit FG having a negative refractive power and being located on the object side, and a rear lens unit RG having a positive refractive power and being located on the image side, with an aperture stop SP being interposed in between. A reference symbol Li denotes an i-th lens located at an i-th position counted in order from the object side to the image side, while reference symbol LC denotes a cemented lens formed by cementing two lenses together.

Reference symbol IP denotes an image plane, which corresponds to an imaging plane of a solid-state image pickup element (a photoelectric conversion element) such as a CCD sensor and a CMOS sensor when the optical system is used as an imaging optical system for a digital video camera or a digital still camera, or corresponds to a film plane in the case of a silver halide film camera. In the meantime, a cover glass member having a large or infinite focal length may be attached to the object side of a first lens L1.

In order from the left side, each set of the vertical aberration diagrams depict spherical aberration, astigmatism, distortion, and lateral chromatic aberration, respectively. In the diagram depicting the spherical aberration, a solid line indicated with d represents a d line (with a wavelength at 587.6 nm), and a chain double-dashed line indicated with g represents a g line (with a wavelength at 435.8 nm). Meanwhile, in the diagram depicting the astigmatism, a solid line indicated with ΔS represents a sagittal image plane of the d line, and a dashed line indicated with ΔM represents a meridional image plane of the d line. In the meantime, the diagram depicting the distortion represents distortion in the d line. The lateral chromatic aberration represents the aberration of g line with respect to the d line. Reference symbol Fno denotes the F-number and reference symbol ω represents a half angle of view (degrees) of the angle of view. The diagram of distortion shows an amount of deviation from an ideal image height Y, which is defined as Y=f×tan(ω).

In the optical system LA of each embodiment, the first lens L1 to a fourth lens L4 play the same role in the light of aberration correction. Forming each of the first lens L1 having the negative refractive power and a second lens L2 having the negative refractive power to have a meniscus shape having a concave surface on the image side, to thereby achieve a wide angle of view and reduce the occurrence of the distortion and the astigmatism.

A third lens L3 is disposed in the front lens unit having the negative refractive power and being located closer to the object side than the aperture stop SP, thereby correcting the negative distortion caused by the first lens L1 and the second lens L2. Moreover, the third lens L3 reduces the occurrence of the spherical aberration by being disposed near the aperture stop SP. The fourth lens L4 having the positive refractive power is provided with the aspherical lens surfaces, to thereby properly correct the spherical aberration and coma.

Next, the lens configuration other than the above-mentioned features regarding the optical system LA of each embodiment will be described below.

First Embodiment

An optical system LA of the first embodiment of the present invention will be described with reference to FIGS. 1 and 2. As for the lens configuration, the optical system LA includes the following lenses in order from the object side to the image side. Specifically, the front lens unit FG includes the first lens L1 having the negative refractive power, the second lens L2 having the negative refractive power, and the third lens L3 having the positive refractive power. The rear lens unit RG includes the fourth lens L4 having the positive refractive power, and the cemented lens LC formed by cementing a biconvex fifth lens L5 having a positive refractive power and a sixth lens L6 having a negative refractive power together.

The occurrence of the spherical aberration is reduced by disposing the third lens L3 having the positive refractive power near the aperture stop SP. Curvature of field is properly corrected by disposing the sixth lens L6 having the negative refractive power in the rear lens unit RG having the positive refractive power.

Second Embodiment

An optical system LA of a second embodiment of the present invention will be described with reference to FIGS. 3 and 4. As for the lens configuration, the optical system LA includes the following lenses in order from the object side to the image side. Specifically, the front lens unit FG includes the first lens L1 having the negative refractive power, the second lens L2 having the negative refractive power, and the third lens L3 having the positive refractive power. The rear lens unit RG includes the fourth lens L4 having the positive refractive power, and the cemented lens LC formed by cementing a meniscus fifth lens L5 having a convex surface on the object side and having the negative refractive power and a sixth lens L6 having the positive refractive power together.

The curvature of field is properly corrected by disposing the fifth lens L5 having the negative refractive power in the rear lens unit RG having the positive refractive power. By disposing the sixth lens L6 closest to the image side, an effective diameter of the fourth lens L4 is downsized so as to lower an incident height of a principal ray of off-axial rays, thereby reducing the curvature of field originating from the fourth lens L4.

Third Embodiment

An optical system LA of a third embodiment of the present invention will be described with reference to FIGS. 5 and 6. As for the lens configuration, the optical system LA includes the following lenses in order from the object side to the image side. Specifically, the front lens unit FG includes the first lens L1 having the negative refractive power, the second lens L2 having the negative refractive power, and the third lens L3 having the positive refractive power. The rear lens unit RG includes the fourth lens L4 having the positive refractive power, and the cemented lens LC formed by cementing the biconvex fifth lens L5 having the positive refractive power and the sixth lens L6 having the negative refractive power together.

The occurrence of the spherical aberration is reduced by disposing the third lens L3 having the positive refractive power near the aperture stop SP. The curvature of field is properly corrected by disposing the sixth lens L6 having the negative refractive power in the rear lens unit RG having the positive refractive power.

As described above, the optical system LA of each embodiment comprises, in order from the object side to the image side, the front lens unit FG having the negative refractive power, the aperture stop SP, and the rear lens unit RG having the positive refractive power. Moreover, the front lens unit FG consists of the first lens L1 having the negative refractive power and having a concave surface on the image side, the second lens L2 having the negative refractive power and having a concave surface on the image side, and the third lens L3 having the positive refractive power. Meanwhile, the rear lens unit RG consists of the fourth lens L4 having the positive refractive power and including an aspherical lens surface, and the cemented lens LC formed by cementing the two lenses together.

The two lenses constituting the cemented lens LC are the lens having the positive refractive power and the lens having the negative refractive power. The two lenses may be arranged in any order in the optical axis direction. Meanwhile, a distance from the lens surface on the object side of the first lens L1 to the lens surface on the image side of the third lens L3 is represented by DFG, a focal length of the third lens L3 is represented by f3, and a focal length of the optical system is represented by f. Then, the following conditional expressions are satisfied:

$$1.0 < DFG/f < 2.5 \quad (1); \text{ and}$$

$$3.0 < f3/f < 20.0 \quad (2).$$

Next, the technical significance of each of the above-mentioned conditional expressions will be described. The conditional expression (1) appropriately defines a ratio between the thickness DFG on the optical axis of the front lens unit FG and the focal length of the optical system in order to downsize the effective diameter of the front lens (the effective diameter of the first lens L1) and the total length of the optical system.

If the thickness on the optical axis of the front lens unit FG increases and the ratio gets larger than the upper limit of the conditional expression (1), the distance between the aperture stop SP and the first lens L1 becomes larger, which makes it difficult to downsize the effective diameter of the front lens. If the thickness on the optical axis of the front lens unit FG decreases and the ratio gets shorter than the lower limit of the conditional expression (1), a principal point interval between the front lens unit FG and the rear lens unit RG gets closer. As a consequence, the negative refractive power of the first lens L1 and the negative refractive power of the second lens L2 become stronger (an absolute value of each negative refractive power becomes larger), whereby an incident angle of a ray on each lens and an output angle of the ray to each lens are increased. For this reason, it is difficult to reduce the astigmatism.

The conditional expression (2) appropriately defines a ratio between the focal length of the third lens L3 and the focal length of the optical system in order to reduce the astigmatism originating from the third lens L3. If the positive refractive power of the third lens L3 gets weaker and the ratio gets larger than the upper limit of the conditional expression (2), the occurrence of the astigmatism is reduced but it is difficult to correct the negative distortion originating from the first lens L1 and the second lens L2 instead. If the positive refractive power of the third lens L3 gets stronger and the ratio gets smaller than the lower limit of the conditional expression (2), an output angle of an off-axial ray outputted from the lens surface on the image side of the third lens L3 becomes larger. Accordingly, the occurrence of the astigmatism is increased and it is difficult to correct the astigmatism.

Here, it is more preferable to set the ranges of the numerical values of the conditional expression (1) and the conditional expression (2) as follows:

$$1.7 < DFG/f < 2.4 \quad (1a); \text{ and}$$

$$3.1 < f3/f < 6.0 \quad (2a).$$

In the present invention, it is more preferable that at least one of the following expressions be satisfied. Here, a focal length of the fourth lens L4 is represented by f4. A refractive index of the material of the first lens L1 with respect to the d line is represented by Nd1, and a refractive index of the material of the second lens L2 with respect to the d line is represented by Nd2. A total length of the optical system is represented by LD. Note that the total length of the optical system is a value obtained by adding a value of a back focus BF in air to a distance from the first lens surface to the last lens surface.

A focal length of the first lens L1 is represented by f1 and a focal length of the second lens L2 is represented by f2. In this case, the optical system desirably satisfies at least one of the following conditional expressions:

$$1.3 < f4/f < 2.5 \quad (3);$$

$$1.5 < Nd1 < 2.0 \quad (4);$$

$$1.5 < Nd2 < 2.0 \quad (5);$$

$$4.5 < LD/f < 8.0 \quad (6);$$

$$-5.0 < f1/f < -2.0 \quad (7); \text{ and}$$

$$-3.0 < f2/f < -1.0 \quad (8).$$

Next, the technical significance of each of the above-mentioned conditional expressions will be described. The conditional expression (3) appropriately defines a ratio between the focal length of the fourth lens L4 and the focal length of the optical system in order to reduce the occurrence of the spherical aberration and the coma. If the positive refractive power of the fourth lens L4 gets weaker and the ratio gets larger than the upper limit of the conditional expression (3), the positive refractive power of the third lens L3, which is the lens having the positive refractive power (the positive lens) disposed near the aperture stop SP, becomes strong and it is therefore difficult to reduce the occurrence of the astigmatism. If the positive refractive power of the fourth lens L4 gets stronger and the ratio gets smaller than the lower limit of the conditional expression (3), it is difficult to reduce the occurrence of the spherical aberration and the coma.

The conditional expression (4) appropriately defines the refractive index of the material of the first lens L1 with respect to the d line in order to reduce the occurrence of the lateral chromatic aberration and the curvature of field. If the refractive index of the material of the first lens L1 gets larger than the upper limit of the conditional expression (4), it is difficult to properly correct the lateral chromatic aberration. If the refractive index of the material of the first lens L1 gets smaller than the lower limit of the conditional expression (4), it is difficult to properly correct the curvature of field.

The conditional expression (5) appropriately defines the refractive index of the material of the second lens L2 with respect to the d line in order to reduce the occurrence of the lateral chromatic aberration and the curvature of field. If the refractive index of the material of the second lens L2 gets larger than the upper limit of the conditional expression (5), it is difficult to properly correct the lateral chromatic aberration. If the refractive index of the material of the second lens L2 gets smaller than the lower limit of the conditional expression (5), it is difficult to properly correct the curvature of field.

The conditional expression (6) appropriately defines a ratio between the total length of the optical system and the focal length of the optical system in order to reduce the total length of the optical system and to downsize the effective diameter of the front lens. If the total length of the optical system increases and the ratio gets larger than the upper limit of the conditional expression (6), the refractive power of each of the lenses becomes weaker (an absolute value of each refractive power becomes smaller), and the distance between the front lens (the first lens L1) and the aperture stop SP becomes longer. As a consequence, it is difficult to downsize the effective diameter of the front lens. If the total length of the optical system decreases and the ratio gets smaller than the lower limit of the conditional expression (6), the positive refractive power of the fourth lens L4 becomes stronger, and it is difficult to reduce the occurrence of the spherical aberration and the coma.

The conditional expression (7) appropriately defines a ratio between the focal length of the first lens L1 and the focal length of the optical system in order to reduce the astigmatism. If the negative refractive power of the first lens L1 gets weaker (the absolute value of the negative refractive power becomes smaller) and the ratio gets smaller than the lower limit of the conditional expression (7), the distance between the first lens L1 and the aperture stop SP becomes longer, and it is difficult to downsize the effective diameter of the front lens. If the negative refractive power of the first lens L1 gets stronger (the absolute value of the negative refractive power becomes larger) and the ratio gets larger than the upper limit of the conditional expression (7), the output angle of the off-axial ray outputted from the first lens L1 becomes larger, and it is difficult to reduce the occurrence of the astigmatism.

The conditional expression (8) appropriately defines a ratio between the focal length of the second lens L2 and the focal length of the optical system in order to reduce the astigmatism. If the negative refractive power of the second lens L2 gets weaker and the ratio gets smaller than the lower limit of the conditional expression (8), the distance between either the first lens L1 or the second lens L2 and the aperture stop SP becomes longer, and it is difficult to downsize the effective diameter of the front lens. If the negative refractive power of the second lens L2 gets stronger and the ratio gets larger than the upper limit of the conditional expression (8), the incident angle of the off-axial ray incident on the second lens L2 or the output angle of the off-axial ray outputted from the second lens L2 becomes larger, and it is difficult to reduce the occurrence of the astigmatism.

Here, in each embodiment, it is more preferable to set the ranges of the numerical values of the conditional expressions (3) to (8) as follows:

$$1.5 < f4/f < 2.1 \quad (3a);$$

$$1.6 < Nd1 < 1.9 \quad (4a);$$

$$1.6 < Nd2 < 1.9 \quad (5a);$$

$$5.5 < LD/f < 7.0 \quad (6a);$$

$$-4.0 < f1/f < -2.5 \quad (7a); \text{ and}$$

$$-2.5 < f2/f < -1.5 \quad (8a).$$

The preferred embodiments of the present invention have been described above. It is to be noted, however, that the present invention is not limited only to the above-described embodiments and various modifications and changes are possible within the scope of the gist of the invention.

Next, a single-lens reflex camera as an example of an image pickup apparatus of the present invention will be described with reference to FIG. 7. In FIG. 7, reference numeral 10 denotes an imaging optical system formed from an optical system 1 according to any one of the first to third embodiments. The imaging optical system 10 is held by a lens barrel 2 serving as a holding member. Reference numeral 20 denotes a camera body. The camera body 20 includes a quick return mirror 3, a focusing glass 4, a penta prism 5, an eyepiece 6, and the like. The quick return mirror 3 reflects a light flux from the imaging optical system 10 upward. The focusing glass 4 is disposed at an image formation position in the imaging optical system 10. The penta prism 5 converts a reverse image formed on the focusing glass 4 into an erected image.

An observer observes the erected image through the eyepiece 6. Reference numeral 7 denotes a photosensitive surface, on which a solid-state image pickup element (a photoelectric conversion element) such as a CCD sensor and a CMOS sensor, a silver halide film, or the like is disposed to receive the image. At the time of shooting, the quick return mirror 3 recedes from an optical path, and the imaging optical system 10 forms the image on the photosensitive surface 7.

An image pickup apparatus having a high optical performance is realized by applying the above-described optical system to an imaging optical system of an interchangeable lens for a single-lens reflex camera, and the like. Besides cameras such as a digital camera, a video camera, and a silver halide film camera, the optical system of the present invention is also applicable to optical devices such as a telescope, binoculars, a copier, and a projector. In addition, the optical system of the present invention is also applicable to a single-lens mirrorless camera not provided with a quick return mirror.

Numerical data sets 1 to 3 corresponding to the first to third embodiments, respectively, are shown below. In each numerical data set, i denotes the order of the surface counted from the object side, ri denotes an i-th curvature radius (of an i-th surface), di denotes an interval between the i-th surface and an i+1-th surface, and ndi and vdi denote a refractive index and Abbe's number based on the d line of an optical medium between the i-th surface and the i+1-th surface, respectively. Meanwhile, BF denotes a back focus in air. The total length of the optical system is the value obtained by adding the value of the back focus BF to the distance from the first lens surface to the last lens surface.

Meanwhile, an aspheric surface is expressed by adding a code*affixed to the relevant surface number. When an amount of displacement from a surface vertex in the optical axis direction is defined as X, a height from the optical axis and in a direction perpendicular to the optical axis is defined as h, a paraxial curvature radius is defined as h, a conic constant is defined as K, and aspherical coefficients of respective orders are defined as A4, A6, A8, and A10, the aspheric shape is expressed as follows:

$$X(h) = \frac{(1/r)h^2}{1+\sqrt{1-(1+K)(h/r)^2}} + A4 \cdot h^4 + A6 \cdot h^6 + A8 \cdot h^8 + A10 \cdot h^{10}.$$

Here, the expression "e±XX" in each aspherical coefficient is equivalent to "×10$^{\pm XX}$". In the meantime, Table 1 shows numerical values corresponding to the respective conditional expressions mentioned above concerning each numerical data set.

[Numerical Data 1]

| [unit: mm] | | | | |
|---|---|---|---|---|
| Surface Data | | | | |
| surface no. i | ri | di | ndi | vdi |
| 1 | 13.480 | 0.60 | 1.69680 | 55.5 |
| 2 | 3.579 | 1.34 | | |
| 3* | 7.703 | 0.50 | 1.69350 | 53.2 |
| 4* | 2.284 | 1.40 | | |
| 5 | 12.052 | 1.72 | 1.70154 | 41.2 |
| 6 | −12.052 | 0.06 | | |
| 7(stop) | ∞ | 2.31 | | |
| 8* | 9.461 | 2.27 | 1.59201 | 67.0 |
| 9* | −3.394 | 0.10 | | |
| 10 | 8.922 | 2.20 | 1.48749 | 70.2 |
| 11 | −6.104 | 0.45 | 1.95906 | 17.5 |
| 12 | 126.862 | 3.78 | | |
| image plane | ∞ | | | |

Aspheric Surface Data

3rd surface

K = 0.00000e+000
A4 = 2.89811e−003
A6 = −3.19022e−004

4th surface

K = 0.00000e+000
A4 = −4.69590e−004
A6 = 9.20615e−004
A8 = −2.31641e−004
A10 = −6.94765e−005

8th surface

K = 0.00000e+000
A4 = −2.84486e−003
A6 = 1.65312e−004

9th surface

K = 0.00000e+000
A4 = 3.59159e−003
A6 = −9.10774e−006
A8 = 3.06456e−005

Various Data

| | |
|---|---|
| Focal Length | 2.48 |
| F-number | 2.88 |
| Half Angle of View (Degs.) | 70.8 |
| Image Height | 3.17 |
| Total Length of Optical System | 16.74 |
| BF | 3.78 |

[Numerical Data 2]

| [unit: mm] | | | | |
|---|---|---|---|---|
| Surface Data | | | | |
| surface no. i | ri | di | ndi | vdi |
| 1 | 10.671 | 0.60 | 1.79136 | 47.0 |
| 2 | 3.509 | 1.35 | | |
| 3 | 7.325 | 0.50 | 1.72422 | 54.4 |
| 4* | 2.160 | 1.88 | | |
| 5 | 9.072 | 1.13 | 1.84712 | 23.8 |
| 6 | −41.834 | 0.12 | | |
| 7(stop) | ∞ | 2.20 | | |
| 8* | 7.626 | 2.05 | 1.61881 | 63.9 |
| 9* | −4.320 | 0.10 | | |
| 10 | 8.497 | 0.45 | 1.95906 | 17.5 |
| 11 | 3.894 | 2.23 | 1.48749 | 70.2 |
| 12 | −20.651 | 4.31 | | |
| image plane | ∞ | | | |

Aspheric Surface Data

4th surface

K = 0.00000e+000
A4 = −4.28468e−003
A6 = 3.47500e−004
A8 = −4.70858e−004

8th surface

K = 0.00000e+000
A4 = −1.56532e−003
A6 = 3.10629e−004

9th surface

K = 0.00000e+000
A4 = 3.33603e−003
A6 = 9.66173e−005
A8 = 2.93916e−005

Various Data

| | |
|---|---|
| Focal Length | 2.38 |
| F-number | 2.88 |
| Half Angle of View (Degs.) | 74.4 |

-continued

[unit: mm]

| | |
|---|---|
| Image Height | 3.17 |
| Total Length of Optical System | 16.92 |
| BF | 4.31 |

[Numerical Data 3]

[unit: mm]

Surface Data

| surface no. i | ri | di | ndi | vdi |
|---|---|---|---|---|
| 1 | 8.880 | 0.60 | 1.77250 | 49.6 |
| 2 | 3.498 | 1.49 | | |
| 3 | 11.931 | 0.45 | 1.69350 | 53.2 |
| 4* | 2.392 | 1.30 | | |
| 5 | 20.368 | 1.06 | 1.88300 | 40.8 |
| 6 | −9.883 | 1.00 | | |
| 7(stop) | ∞ | 1.65 | | |
| 8* | 11.069 | 1.92 | 1.59201 | 67.0 |
| 9* | −3.260 | 0.10 | | |
| 10 | 8.907 | 2.10 | 1.48749 | 70.2 |
| 11 | −4.778 | 0.41 | 1.95906 | 17.5 |
| 12 | −28.415 | 2.45 | | |
| 13 | ∞ | 0.20 | 1.51633 | 64.1 |
| 14 | ∞ | 1.07 | | |
| image plane | ∞ | | | |

Aspheric Surface Data

4th surface

K = 0.00000e+000
A4 = −6.00733e−004
A6 = 4.04176e−004
A8 = −1.37712e−004

8th surface

K = 0.00000e+000
A4 = −3.41536e−003
A6 = 9.91319e−005

9th surface

K = 0.00000e+000
A4 = 2.90439e−003
A6 = −3.07623e−005
A8 = 2.69479e−005

Various Data

| | |
|---|---|
| Focal Length | 2.43 |
| F-number | 2.88 |
| Half Angle of View (Degs.) | 71.4 |
| Image Height | 3.17 |
| Total Length of Optical System | 15.73 |
| BF | 3.65 |

TABLE 1

| | Embodiment | | |
|---|---|---|---|
| Conditional Expression | 1 | 2 | 3 |
| 1  $1.0 < DFG/f < 2.5$ | 2.254 | 2.298 | 2.016 |
| 2  $3.0 < f3/f < 20.0$ | 3.580 | 3.741 | 3.152 |
| 3  $1.3 < f4/f < 2.5$ | 1.825 | 2.007 | 1.842 |
| 4  $1.5 < Nd1 < 2.0$ | 1.697 | 1.791 | 1.772 |
| 5  $1.5 < Nd2 < 2.0$ | 1.694 | 1.724 | 1.694 |
| 6  $4.5 < LD/f < 8.0$ | 6.888 | 7.125 | 6.508 |
| 7  $-5.0 < f1/f < -2.0$ | −2.892 | −2.886 | −3.230 |
| 8  $-3.0 < f2/f < -1.0$ | −1.974 | −1.855 | −1.810 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079395, filed Apr. 12, 2016, which is hereby incorporated by reference herein in its entirety.

What is claimed is:

1. An optical system comprising, in order from an object side to an image side:
a front lens unit having a negative refractive power;
an aperture stop; and
a rear lens unit having a positive refractive power, wherein
the front lens unit consists of, in order from the object side to the image side, a first lens having a negative refractive power with a concave surface being on the image side, a second lens having a negative refractive power with a concave surface on the image side, and a third lens having a positive refractive power,
the rear lens unit consists of, in order from the object side to image side, a fourth lens having a positive refractive power, and a cemented lens formed by cementing a positive lens and a negative lens together, and
the following conditional expressions are satisfied:

$$1.0 < DFG/f < 2.5, \text{ and}$$

$$3.0 < f3/f < 20.0$$

where DFG represents a distance on an optical axis from a lens surface on the object side of the first lens to a lens surface on the image side of the third lens, f3 represents a focal length of the third lens, and f represents a focal length of the optical system.

2. The optical system according to claim 1, wherein the following conditional expression is satisfied, $$1.3 < f4/f < 2.5$$

where f4 represents a focal length of the fourth lens.

3. The optical system according to claim 1, wherein the following conditional expression is satisfied, $$1.5 < Nd1 < 2.0$$

where Nd1 represents a refractive index of a material of the first lens.

4. The optical system according to claim 1, wherein the following conditional expression is satisfied, $$1.5 < Nd2 < 2.0$$

where Nd2 represents a refractive index of a material of the second lens.

5. The optical system according to claim 1, wherein the following conditional expression is satisfied, $$4.5 < LD/f < 8.0$$

where LD represents a total length of the optical system.

6. The optical system according to claim 1, wherein the following conditional expression is satisfied, $$-5.0 < f1/f < -2.0$$

where f1 represents a focal length of the first lens.

7. The optical system according to claim 1, wherein the following conditional expression is satisfied, $$-3.0 < f2/f < -1.0,$$

where f2 represents a focal length of the second lens.

8. The optical system according to claim 1, wherein the two lenses constituting the cemented lens are, in order from the object side to the image side, a fifth lens having a biconvex shape and having a positive refractive power, and a sixth lens having a negative refractive power.

9. The optical system according to claim 1, wherein the two lenses constituting the cemented lens are, in order from the object side to image side, a meniscus fifth lens having a convex surface on the object side and having a negative refractive power, and a biconvex sixth lens having a positive refractive power.

10. The optical system according to claim 1, wherein the third lens is a biconvex lens.

11. The optical system according to claim 1, wherein the fourth lens is a biconvex lens.

12. The optical system according to claim 1, wherein the fourth lens has an aspherical lens surface.

13. An image pickup apparatus, comprising:
an optical system; and
an image pickup element configured to receive an image formed by the optical system,
the optical system comprising, in order from an object side to an image side:
a front lens unit having a negative refractive power, an aperture stop, and a rear lens unit having a positive refractive power, wherein
the front lens unit consists of, in order from the object side to image side, a first lens having a negative refractive power with a concave surface on the image side, a second lens having a negative refractive power with a concave surface on the image side, and a third lens having a positive refractive power,
the rear lens unit consists of, in order from the object side to image side, a fourth lens having a positive refractive power, and a cemented lens formed by cementing a positive lens and a negative lens together, and
the following conditional expressions are satisfied, $1.0 < DFG/f < 2.5$, and $3.0 < f3/f < 20.0$ where DFG represents a distance on an optical axis from a lens surface on the object side of the first lens to a lens surface on the image side of the third lens, f3 represents a focal length of the third lens, and f represents a focal length of the optical system.

* * * * *